US009634892B2

(12) United States Patent
Das

(10) Patent No.: US 9,634,892 B2
(45) Date of Patent: Apr. 25, 2017

(54) CONFIGURING A VEHICLE TO RECEIVE CONTENT DATA

(71) Applicant: General Motors LLC, Detroit, MI (US)

(72) Inventor: Swapan Das, Canton, MI (US)

(73) Assignee: General Motors LLC, Detroit, MI (US)

(*) Notice: Subject to any disclaimer, the term of this patent is extended or adjusted under 35 U.S.C. 154(b) by 163 days.

(21) Appl. No.: 14/589,579

(22) Filed: Jan. 5, 2015

(65) Prior Publication Data
US 2016/0197776 A1 Jul. 7, 2016

(51) Int. Cl.
H04L 12/24 (2006.01)
H04W 8/26 (2009.01)
H04W 8/20 (2009.01)
H04W 4/02 (2009.01)
H04M 3/42 (2006.01)
H04M 3/487 (2006.01)

(52) U.S. Cl.
CPC ........... *H04L 41/0806* (2013.01); *H04W 4/02* (2013.01); *H04W 8/205* (2013.01); *H04W 8/265* (2013.01); *H04M 3/42144* (2013.01); *H04M 3/4872* (2013.01)

(58) Field of Classification Search
CPC .......... H04L 41/0806; H04M 3/42144; H04W 8/265; H04W 8/205; H04W 3/42144

USPC .......................................................... 701/36
See application file for complete search history.

(56) References Cited

U.S. PATENT DOCUMENTS

| 2004/0203692 A1* | 10/2004 | Schwinke | G07C 5/008 455/419 |
| 2009/0299857 A1* | 12/2009 | Brubaker | G06Q 30/02 705/14.66 |
| 2013/0200991 A1* | 8/2013 | Ricci | G08C 19/00 340/4.3 |
| 2014/0199962 A1* | 7/2014 | Mohammed | H04M 15/70 455/406 |

* cited by examiner

Primary Examiner — Richard Camby
(74) Attorney, Agent, or Firm — Christopher DeVries; Reising Ethington P.C.

(57) ABSTRACT

A communication system and methods of using the communication system is described. One method includes configuring a telematics unit in a vehicle with at least one access point name (APN). The steps of the method include: configuring the telematics unit with a default APN prior to a legal transfer of possession of the vehicle; and thereafter, activating the telematics unit for the provision of content data in connection with the legal transfer of possession of the vehicle, wherein the activating includes replacing the default APN of the telematics unit with a geographically-specific APN.

7 Claims, 6 Drawing Sheets

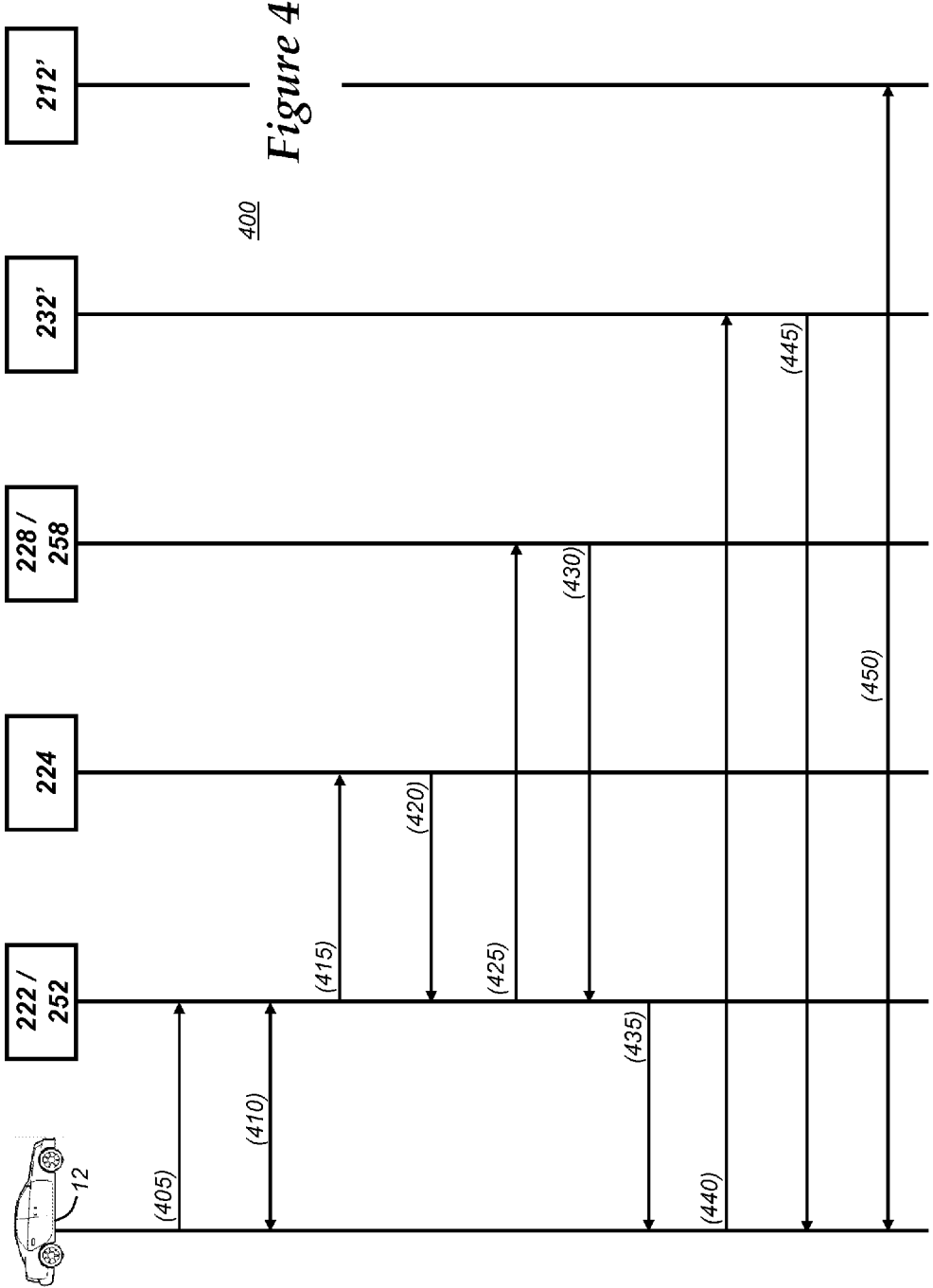

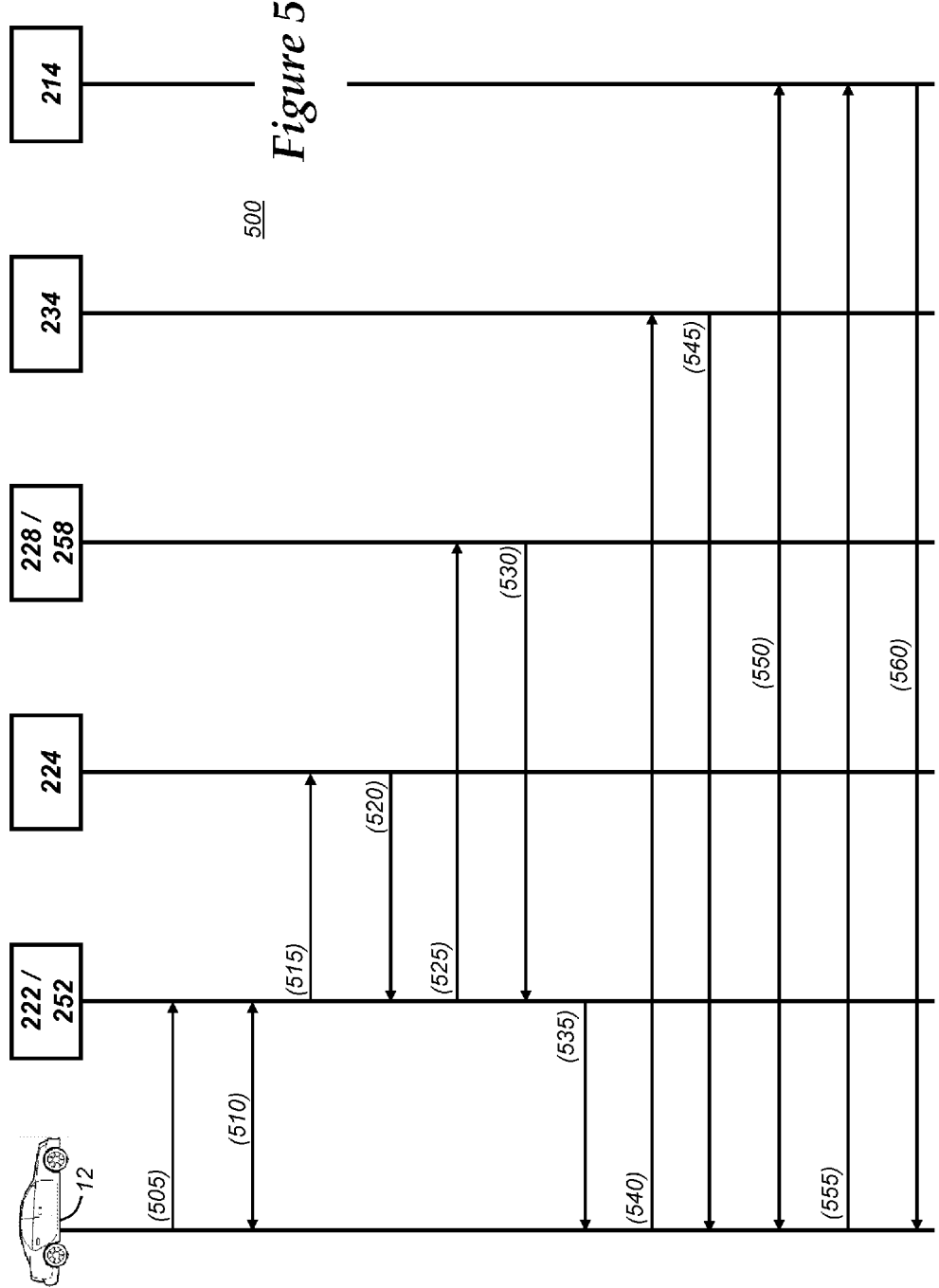

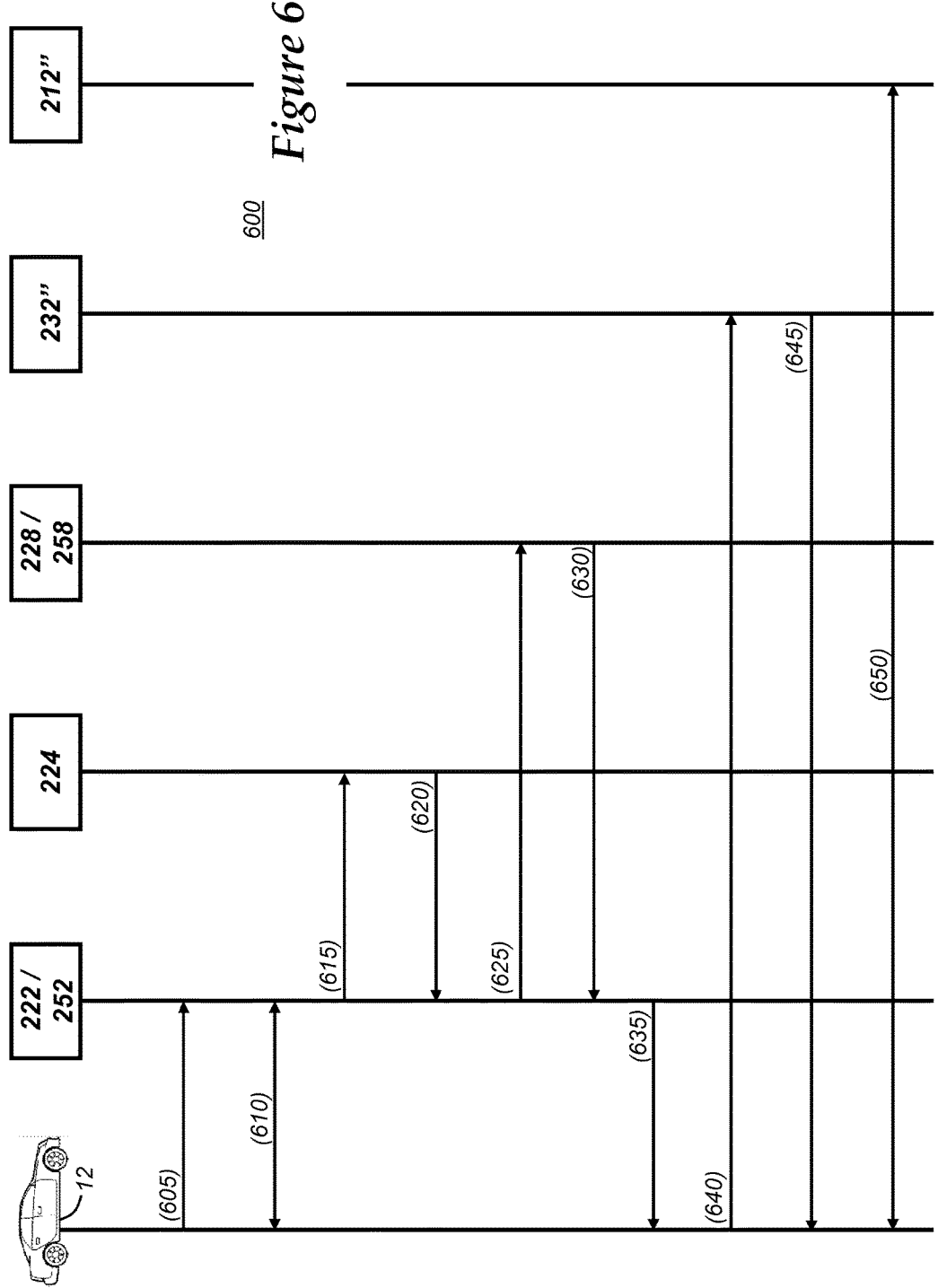

CONFIGURING A VEHICLE TO RECEIVE CONTENT DATA

TECHNICAL FIELD

The present invention relates to configuring a vehicle to receive content data, and more particularly, to receive content data that is in compliance with laws and regulations.

BACKGROUND

Content data or internet content broadly includes any textual, visual, or aural content transmitted over the World Wide Web, data conveyed using various communication means (e.g., e-mail, Internet telephony, SMS, etc.), and data conveyed using various data transfer means (e.g., including file sharing, streaming media, etc.). Thus, internet content also includes: local and regional events and information, news and financial data, location data, social relation data, pop-culture information, sports and entertainment information, fitness data, on-line shopping data, just to name a few examples.

Some countries and/or governmental entities censor internet content. For example, in some jurisdictions, the transmission of certain private, obscene, or explicit content may be prohibited by law. In another example, a content provider licensed in one jurisdiction may not be licensed to provide or distribute its content in another jurisdiction. In some instances, this can pose problems for vehicles manufactured in one jurisdiction and then sold at a dealership in another jurisdiction or for example, having wireless services activated in one jurisdiction and then driven into another.

SUMMARY

According to an embodiment of the invention, there is provided a method of configuring a telematics unit in a vehicle with at least one access point name (APN). The steps of the method include: configuring the telematics unit with a default APN prior to a legal transfer of possession of the vehicle; and thereafter, activating the telematics unit for the provision of content data in connection with the legal transfer of possession of the vehicle, wherein the activating includes replacing the default APN of the telematics unit with a geographically-specific APN.

According to another embodiment of the invention, there is provided a method of configuring a telematics unit in a vehicle with at least one access point name (APN). The steps of the method include: configuring the telematics unit for a vehicle dealership demonstration of vehicle services, wherein the vehicle services include data content based on a physical location of the vehicle; and then following a legal transfer of possession of the vehicle to a customer, configuring the telematics unit to provide data content based on the specific geographic location of an associated transferee.

According to another embodiment of the invention, there is provided a method of configuring a telematics unit in a vehicle with at least one access point name (APN). The steps of the method include: prior to a legal transfer of possession of the vehicle, configuring the telematics unit for a demonstration period at a vehicle dealership, wherein the configuring includes assigning a default APN to the telematics unit; during the demonstration period, providing vehicle services via the telematics unit using the default APN, wherein the vehicle services include data content associated with a geographic area of the vehicle, a geographic position of the vehicle dealership, or both; following the legal transfer of possession of the vehicle to a vehicle user, replacing the default APN with a geographically-specific APN at a time of vehicle services activation, wherein the geographically-specific APN is associated with a home country of the user; and providing vehicle services via the telematics unit using the geographically-specific APN during a subscription period.

BRIEF DESCRIPTION OF THE DRAWINGS

One or more embodiments of the invention will hereinafter be described in conjunction with the appended drawings, wherein like designations denote like elements, and wherein:

FIGS. 4-6 are flow diagrams illustrating various methods of using the communication infrastructures shown in FIGS. 2 and 3.

DETAILED DESCRIPTION OF THE ILLUSTRATED EMBODIMENT(S)

A communication system is described below that first enables a vehicle to receive local content via the internet while the vehicle is part of a vehicle dealership's inventory—thereby a demonstration of vehicle services may be provided to potential customers. Then following a legal transfer of vehicle possession to a customer—e.g., following a sale or lease agreement—the vehicle may receive content based on the customer's home country, which may or may not be the same content providable at the dealership. By these methods, a vehicle manufacturer and dealership may be able to maintain regulatory compliance with local and regional regulations. Further, the customer or transferee of the vehicle may also then be put in compliance.

The methods described herein include configuring the vehicle at the manufacturer with at least two access point names (APNs)—e.g., a temporal or default internet APN (e.g., used when the vehicle is at the dealership for demonstration purposes) and a private APN, which may be used by the vehicle to configure a new vehicle APN (e.g., following or at the time of a legal transfer of possession of the vehicle). Thus, as will be described in greater detail below, the private APN may be used to connect with a vehicle backend, such as a call center, which may configure the vehicle with the new APN. And thereafter, having the new APN, the vehicle may access the content associated with the customer's home country.

These methods will be discussed in detail following a description of a sample operating environment of the vehicle.

Communications System—

Figure 1:
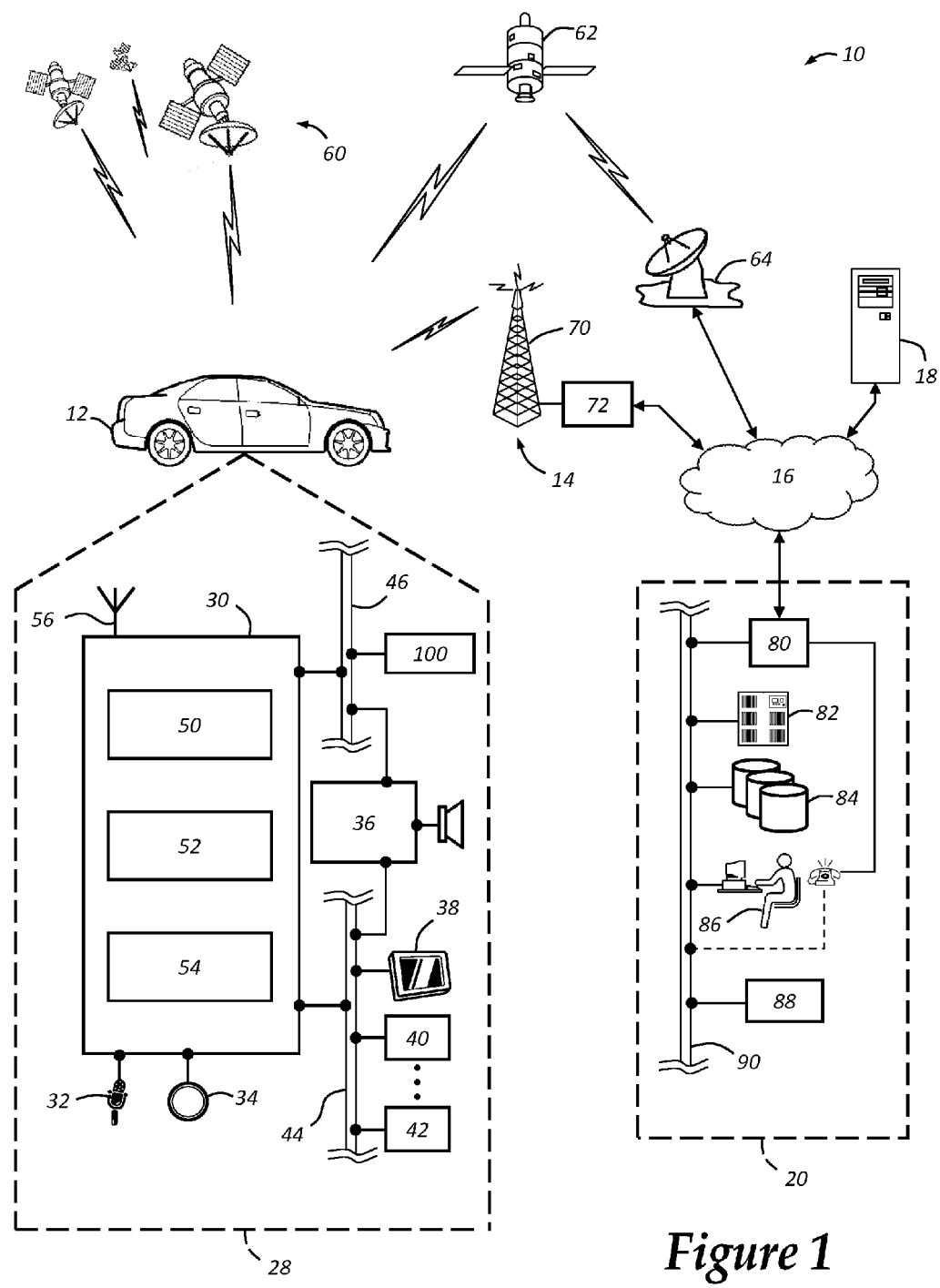
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM, CDMA, and/or LTE standards and thus includes a standard cellular chipset 50 for voice communications like hands-free calling, a wireless modem for data transmission, an electronic processing device 52, one or more digital memory devices 54, and a dual antenna 56. It will be appreciated that other communications standards are also possible (e.g., GSM, CDMA, and LTE are merely examples). It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more suitable wireless protocols (e.g., WiMAX, ZigBee®, etc.), including any short range wireless communication (SRWC) such as any suitable Wi-Fi standard (e.g., IEEE 802.11), Wi-Fi Direct, Bluetooth, wireless infrared transmission, or various combinations thereof. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

The vehicle electronics 28 may also include a communication device such as a vehicle head unit or vehicle multitainment unit (VMU) 100 which may include some of the vehicle electronics previously discussed (e.g., the audio system 36, the visual display 38, etc.). As used herein, the VMU 100 may include all suitable electronics, software, etc. for providing vehicle entertainment and vehicle infotainment services to the vehicle users and/or occupants. In some instances, the VMU 100 is electronically coupled to (and in communication with) the telematics unit 30 (e.g., via bus 46). The unit 100 may be modular or may be embedded within the vehicle 12. The VMU may further include its own processor and memory; the memory may store any suitable software, firmware, etc. for VMU operation and/or interaction with telematics unit 30. Thus, the VMU may receive remote or cellular data via the telematics unit 30—e.g., connecting to the internet, the call center 20, and/or various remotely located servers and computers 18 using the communication capability of the telematics unit (or even other suitable mobile devices in the vehicle). Examples of VMUs include interactive displays in the vehicle instrument panel, interactive displays embedded within the backing of vehicle seating or the vehicle headliner, and other interactive vehicle devices/displays that are portable.

Figure 2:
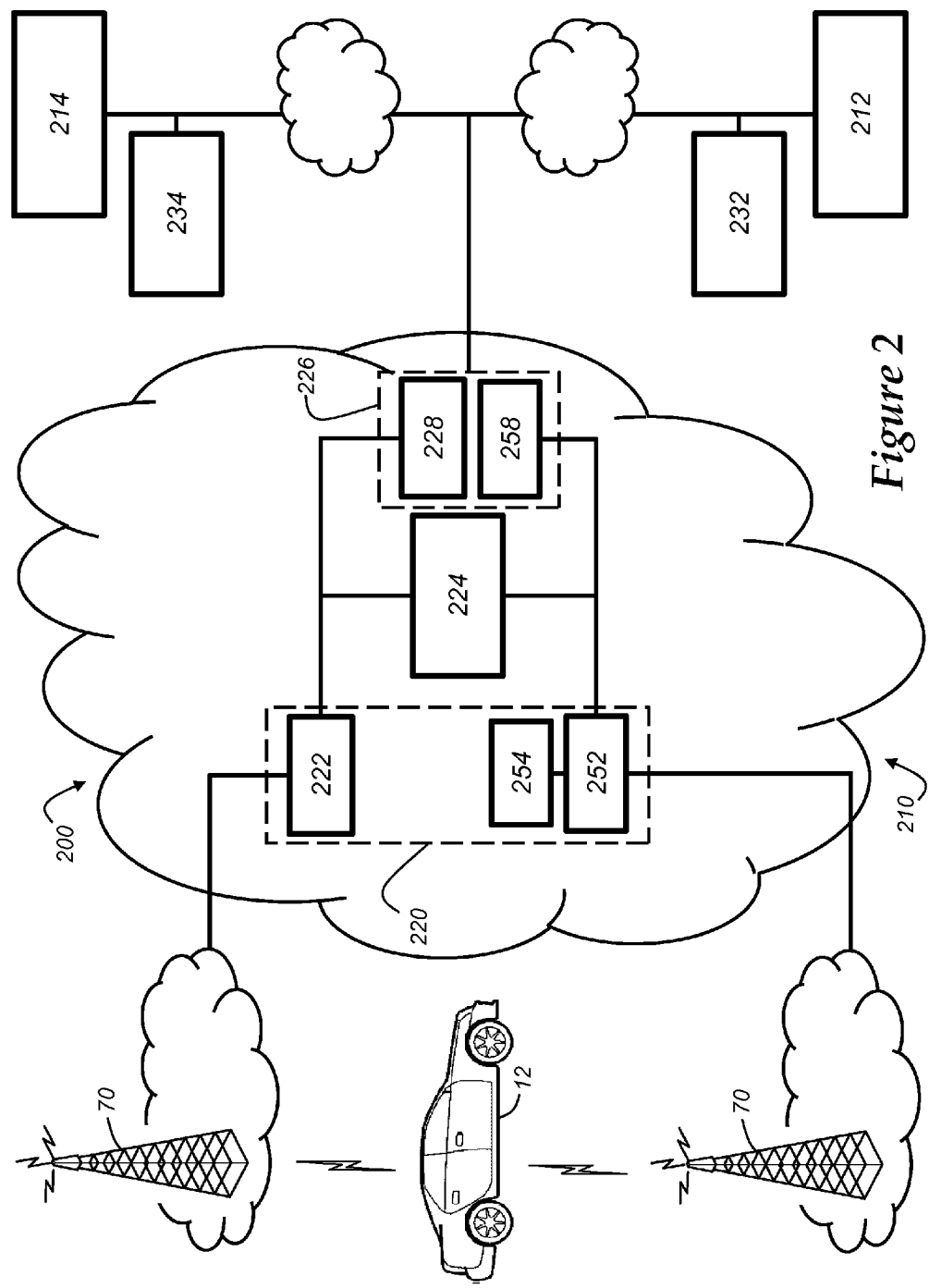
FIG. 2 is a schematic diagram illustrating communication infrastructure for wireless communication.
Figure 3:
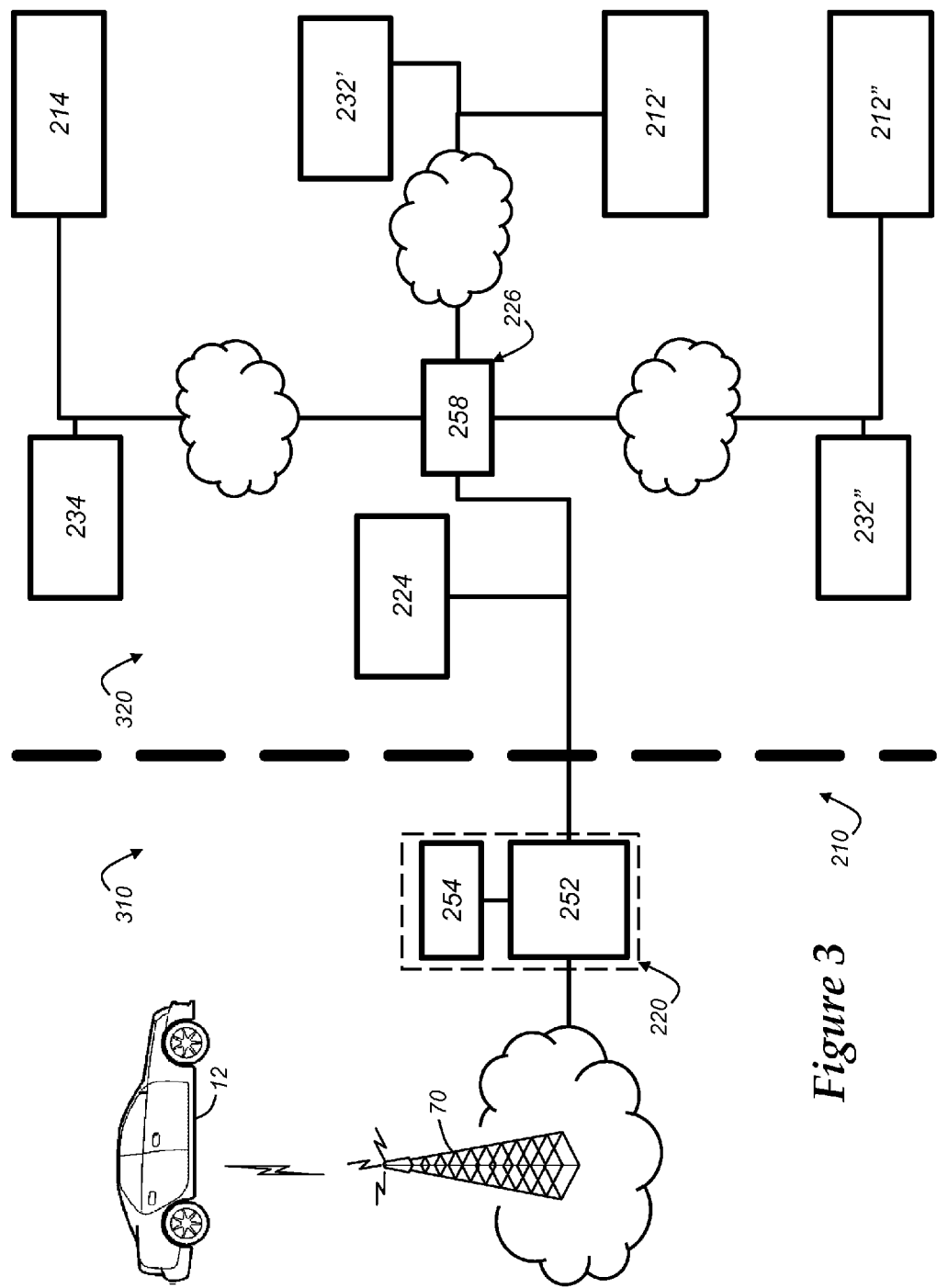
FIG. 3 is another schematic diagram illustrating an LTE communication infrastructure for wireless communication.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA, (e.g., CDMA2000), GSM/GPRS, UMTS, or LTE. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements. FIGS. 2 and 3, discussed in greater detail below, schematically illustrate a couple exemplary telecommunication architectures.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

As discussed above, FIGS. 2 and 3 illustrate a couple of telecommunication architectures. More specifically, FIG. 2 illustrates two communication architecture embodiments: a WCDMA or GSM architecture 200 and an LTE architecture 210. And FIG. 3 illustrates a more detailed view of the LTE architecture 210.

FIG. 2 illustrates the vehicle 12 in communication with a public application service provider (ASP) 212 and a private or backend ASP 214. In one embodiment—according to the WCDMA or the GSM architecture 200, the vehicle 12 communicates with towers 70 electrically coupled to a first network node 220 that includes a Serving GPRS (General Packet Radio Service) Support Node (SGSN) 222 which is in communication with an access point name (APN) domain name server (DNS) 224 and a second network node 226 that includes a Gateway GPRS (General Packet Radio Service) Support Node (GGSN) 228. In addition, the APN DNS 224 and GGSN 228 are also in communication with one another. The GGSN 228 is in communication with: (1) the public ASP 212 and an associated Internet DNS 232; and (2) the backend ASP 214 and an associated backend DNS 234. Similarly, the public ASP and DNS 212, 232 are in communication with one another, as are the backend ASP and DNS 214, 234. This architecture is merely an example to illustrate the methods discussed below; e.g., the architecture may include additional SGSNs, additional GGSNs, additional APN DNSs, additional public and/or private DNSs, and additional public and/or private ASPs.

In another embodiment of FIG. 2—according to the LTE architecture 210, the vehicle 12 communicates with towers 70 electrically coupled to the first network node 220 that includes a Serving Gateway (S-GW) 252 which is in communication with the APN DNS 224 and the second network node 226 that includes a Packet Gateway (P-GW) 258. The S-GW 252 is shown in communication with a Mobility Management Entity (MME) 254—a control node for LTE network access. In addition, the APN DNS 224 and P-GW 258 are also in communication with one another. Similar to the GSM implementation, the P-GW 258 is in communication with: (1) the public ASP and the associated Internet DNS 212, 232; and (2) the backend ASP and the associated backend DNS 214, 234—which are also each in communication with one another, respectively. And, as similarly described above, this architecture 210 is merely an example to illustrate the methods discussed below; e.g., the architecture may include additional S-GWs, additional P-GWs, additional APN DNSs, additional public and/or private DNSs, and additional public and/or private ASPs.

FIG. 3 illustrates a more detailed view of the LTE architecture 210 shown in FIG. 2. More specifically, the vehicle 12, the tower(s) 70, the MME 254, and the S-GW 252 are shown as part of a Visiting Network 310. And the APN DNS 224, the P-GW 258, the backend APS 214, and the backend DNS 234 are shown as part of a Home Network 320. In addition, FIG. 3 illustrates two public ASPs, each having an associated DNS. One public ASP 212' may be a geographically local ASP in communication with an associated local DNS 232' (e.g., local to or within a geographical region associated with the dealership). The other public ASP 212" may be a geographically-remote ASP in communication with an associated geographically-remote DNS 232". For example, one DNS/ASP 212', 232' pair may be located in one country, while the other DNS/ASP pair 212", 232" may be located in another country. Or in another example, both public DNS/ASP pairs (212', 232'; 212", 232") may be in the same or proximate geographic region; however, one DNS/ASP pair (local) 212', 232' may be configured to recognize an APNs from one geographic region (e.g., a first country) while the other DNS/ASP pair (remote) 212", 232" may be configured to recognize APNs from another geographic region (e.g., a second country). These of course are merely examples; other arrangements are also possible.

It should be appreciated that the first network node 220 and the second network node 226 are merely examples. In GSM, WCDMA, and LTE implementations, there may be many first and second network nodes. Similarly, there may be many APN DNS, and various ASPs. Thus, FIGS. 2 and 3 are merely examples to illustrate the methods described below.

Method—

Turning now to FIGS. 4, 5, and 6, there are shown methods 400, 500, 600 (respectively) of vehicle 12 interaction with the LTE communication architecture 210 discussed above. More specifically, in at least one embodiment, the methods of vehicle interaction may occur sequentially; i.e., method 400 followed by method 500, followed then by method 600. And while the methods described below are discussed using elements of the LTE architecture 210, it will be appreciated that the vehicle 12 may similarly interact with the WCDMA/GSM architectures as well (e.g., according to the corresponding elements of the WCDMA/GSM architecture 200, also shown in FIGS. 4-6). Further, as will be appreciated by skilled artisans, other architectures are also possible.

The method 400 shown in FIG. 4 may occur when the vehicle 12 is located at a vehicle dealership. As discussed above, at the dealership, it may be desirable to demonstrate to a customer or potential user vehicle services or automotive features associated with or operable using the vehicle telematics unit 30. For example, a representative at the dealership may wish to demonstrate vehicle services such as receiving internet content via the vehicle's multi-tainment unit (VMU) 100. And as will be illustrated in method 400, this content may be local internet content—i.e., permissible internet content based on the laws and regulations associated with the location of the vehicle dealership (e.g., the country or other geographic boundary in which the dealership is located).

The method 400 begins with step 405 by activating a packet data protocol (PDP) context request to the S-GW 252. This step establishes a communication path (or tunnel) between the vehicle 12 (or more specifically the telematics unit 30) and the network for data transfer. In this step, the telematics unit 30 may provide a default APN (or default internet APN) to the S-GW 252 that includes, among other things, the identity and credentials of the telematics unit in order to access the LTE network. This default internet APN may be assigned by a manufacturer of the vehicle or by service personnel following manufacture. In at least one embodiment, the telematics unit 30 is configured with this default internet APN prior to step 405.

In step 410, various security functions may be performed as well as a radio access bearer (RAB) assignment between the telematics unit 30 and the S-GW 252.

Based on the RAB assignment, in step 415 the S-GW 252 may query the APN DNS 224 using a default Internet APN and in step 420, the APN DNS 224 may respond and acknowledge the S-GW 252.

Thereafter in step 425, the S-GW 252 may create a PDP context request with the P-GW 258 and in step 430, the P-GW 258 may respond accordingly (providing the PDP context response). More specifically, in step 430, the P-GW 258 may assign an IP address based on both the default internet APN and the IP address of the incoming S-GW.

Having established a means to connect the telematics unit 30 in the vehicle 12 to the P-GW 258, the S-GW 252 may communicate this to the telematics unit 30 in step 435—activating the PDP context response (this step being ultimately in response to request of step 405).

Thereafter, the telematics unit 30 may access the internet based on the default internet APN. For example, in step 440, the telematics unit may submit an Internet DNS query to the Internet DNS 232'. This DNS may be any suitable public DNS; in addition, it may or may not be a DNS within a geographical region or area proximate to the dealership and/or the vehicle 12.

In step 445, the Internet DNS 232' may provide a response indicating an address of a desired public ASP (e.g., ASP 212').

Thus, in step 450, the public ASP 212' may provide vehicle services to the telematics unit 30 such as application specific interactions and data. This may include internet content provided the public ASP recognizes and associates the default internet APN (and its information) as being from a source lawfully suitable to receive its content. Thus, the internet content may be in accordance with local laws and governmental regulations. Thus, step 450 may continue as long as the vehicle is lawfully possessed by the dealership.

However, internet content that may be permissible to demonstrate at the dealership may not be permissible if the potential user purchases, leases, etc. the vehicle 12 and/or takes it to another geographical region (e.g., a home country different than the country of the dealership). Consider for example that in step 450 the ASP 212' streams music (e.g., using Pandora™). Streaming Pandora™ music in one country may be lawful while streaming Pandora™ music in a neighboring country may be unlawful due to licensing, restrictions, etc. Internet content (or simply content data) should be construed broadly to include audible and/or visual media (e.g., music, speech, videos, images, etc.) and any other readable, viewable, user experience-able content. Lawfully received content in one geographical area or region may not be lawfully received in another geographical area or region based on contractual restrictions, government censorship, or private regulations governed by a privately-owned ASP, just to name a couple of examples.

Turning now to FIG. 5, the method 500 may occur following a legal transfer of possession of the vehicle from a transferor (e.g., the dealership) to a transferee (e.g., the customer or user—formerly, the potential user). As used herein, legal transfer includes conveying the vehicle 12 from one person to another, and the person may be an actual human being or a 'legal' person (e.g., a non-human entity that is treated as a person for limited legal purposes). Non-limiting examples of legal persons include corporations, limited liability companies, partnerships, etc. Non-limiting examples of legal transfers of possession include the sale, lease, rental, or donation of the vehicle from a seller or a transferor (e.g., the vehicle dealership) to a buyer or a transferee (e.g., the customer)—e.g., the transferor and the transferee could be a human being or a legal person. The legal transfer of possession may include some or all of a bundle of rights associated with the vehicle. For example, when a vehicle is leased or purchased according to an installment plan, a legal transfer may include providing the transferee with rights of possession to the vehicle and designating a lien holder (which may or may not be the dealership), thereby withholding full rights from the transferee to the vehicle's title. Or for example when the transferee provides legal tender to the transferor equal to an agreed upon purchase price, the legal transfer may include providing the transferee with possession and full rights of legal title. These of course are merely examples; other implementations will be apparent to skilled artisans.

FIG. 5 illustrates communicative interaction between the same or similar entities as those shown in FIG. 4. For example, the vehicle 12, the SGSN/S-GW (222/252), the APN DNS 224, and the GGSN/G-PW (228/258) are the same. In FIG. 5, instead of the public internet DNS (local to the dealership) 232', the backend DNS 234 is shown. Similarly, instead of the public ASP (local to the dealership) 212', the backend ASP 214 is shown.

The method begins with step 505 activating a PDP context request. Step 505 may be the similar to step 405 described above, except that instead of providing the default internet APN to the S-GW 252, the telematics unit 30 provides a backend or private APN (or internet APN) associated with the call center 20 or a facility having a similar server 18. The private APN also may be assigned by the vehicle manufacturer (or authorized service personnel), and in at least one embodiment, the telematics unit 30 is configured with this private APN prior to step 505. It will be appreciated by skilled artisans that typically a mobile device has only one APN (or internet APN); thus in at least one implementation, the telematics unit 30 has two internet APNs—the private internet APN that is never changed and the default internet APN that may be changed, as will be described in greater detail below.

Steps 510, 515, 520, 525, 530, and 535 may be virtually identical to steps 410, 415, 420, 425, 430, and 435 discussed above—except that the connection is being established using the private APN. Therefore, they will not be discussed in greater detail here.

Steps 540, 545, and 550 may be virtually identical to steps 440, 445, and 450 discussed above—except that instead of the vehicle 12 communicating with the local internet DNS 232' and local ASP 212', the vehicle is communicating with the backend DNS 234 and backend ASP 214. Thus, according to one embodiment, the call center 20 or server 18 may provide vehicle services such as internet content to the vehicle in step 550 based on the private APN presented by the telematics unit 30. It will be appreciated that various means may be employed during any connection with the backend ASP 214 to ensure safety, privacy, and security (e.g., any suitable network security means, encryption algorithms, etc.).

Method 500 further includes steps 555 and 560 pertaining to user service activation of the telematics unit 30. Service activation pertains to conferring usage accountability to the user (the now lawful transferee of the vehicle 12). For example, while the telematics unit was operable for demonstration purposes at the dealership prior to the sale, lease, etc. of the vehicle, service was not activated 'for the user' (but instead for the dealership). Thus, user service activation may pertain to a variety of service-related parameters— including the capability to wirelessly send and receive voice and data, regional calling capability or restrictions, various calling features (call forwarding, call waiting, etc.), allotted data quantity (e.g., per month or billing period), and various quality of service (QoS) parameters as QoS is understood by skilled artisans, just to name a few examples. Thus, service to the telematics unit should be construed broadly to include any suitable content data (or internet content). Further, service may be subject to a subscription period—e.g., a period of time when services are available to the user.

In step 555, the vehicle 12 may request of the backend ASP 214 service activation. The request may be granted in step 560—thereby activating telematics unit service. According to at least one embodiment, step 560 may include replacing the default internet APN in the vehicle 12 with a home-country-specific or geographically-specific APN (or internet APN). Thus, the default internet APN which was programmed or configured and stored in the telematics unit memory 54 by the manufacturer or other authorized service personnel may be deleted, overwritten, or both, and the geographically-specific internet APN may be stored in memory 54.

The geographically-specific internet APN may be used by the vehicle 12 to receive internet content and telematics services in a predetermined geographical region such as the user's home country during the vehicle user's subscription period—as will be discussed below with respect to FIG. 6. Method 500 may occur at the dealership or at a later time selected by the user and/or dealership. Further, the method may occur in the user's home country, outside of the user's home country, or any other suitable geographical boundary or region.

Turning now to FIG. 6, the method 600 occurs during the user's subscription period, or whenever the user is authorized to receive content data via the telematics unit 30. FIG. 6 illustrates communicative interaction between the same or similar entities as those shown in FIGS. 4 and 5. For example, the vehicle 12, the SGSN/S-GW (222/252), the APN DNS 224, and the GGSN/G-PW (228/258) are the same. In FIG. 6, the home-geo-boundary DNS 232" is shown instead of the local public internet DNS 232' or the backend DNS 234. Similarly, instead of the local public internet ASP 212' or the backend ASP 214, the home-geo-boundary ASP 212" is shown.

The method begins with step 605 activating a PDP context request. Step 605 may be the similar to step 405 described above, except that instead of providing the default internet APN to the S-GW 252, the telematics unit 30 provides the geographically-specific internet APN received during the service activation.

Steps 610, 615, 620, 625, 630, and 635 may be virtually identical to steps 410, 415, 420, 425, 430, and 435 discussed above—except that the connection is being established using the geographically-specific internet APN. Therefore, they will not be discussed in greater detail here.

Steps 640, 645, and 650 may be virtually identical to steps 440, 445, and 450 discussed above—except that instead of the vehicle 12 communicating with the local internet DNS 232' and local ASP 212', the vehicle is communicating with the home-geo-boundary DNS 232" and the home-geo-boundary ASP 212". In providing vehicle services (e.g., content data) via step 650, these vehicle services may be in compliance with the user's home country or geographic region. This may continue as long as a valid subscription period exists.

As discussed above, the processes described and shown in FIGS. 4, 5, and 6 may define an entire process where the steps of methods 400, 500, and 600 may be executed sequentially. These methods may enable the vehicle manufacturer to do the following: to ship vehicles to a number of different geographic regions around the world enabling internet content to be demonstrated at vehicle dealerships in different countries; to reconfigure each vehicle telematics unit 30 in the vehicle 12 once the respective vehicle is sold or leased; and then to enable internet content to be provided to each respective vehicle according to the home geographic region of the owner of the vehicle.

In light of the above description, it will be apparent that in at least one embodiment, the telematics unit may store and use at least two different APNs—one for accessing publicly available DNSs and one for accessing a private DNS (such as a DNS at a vehicle call center). Such private connections may provide safety, security and diagnostic related services which are not typically sensitive to country or region. In addition, it will be apparent that in at least one embodiment, at least one of the internet APNs may be deleted or overwritten and replaced with a different internet APN (e.g., replacing an originally configured public internet APN with a second public internet APN). Access may be granted remotely to the vehicle to replace the original public internet APN with the new public internet APN via a connection established using the private internet APN. Such internet APNs may provide internet related services, such as streaming music etc, which might have regulatory restriction. Thus, in following such processes, the vehicle manufacturer, dealership, and customer may be in compliance with local and regional laws and regulations governing receipt of internet content or content data at the vehicle.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of configuring a telematics unit in a vehicle with at least one access point name (APN), comprising the steps of:
    configuring the telematics unit with a default APN prior to a legal transfer of possession of the vehicle; and thereafter,
    activating the telematics unit for the provision of content data in connection with the legal transfer of possession of the vehicle, wherein the activating includes replacing the default APN of the telematics unit with a geographically-specific APN.

2. The method of claim 1, wherein the configuring step further comprises configuring the telematics unit with a backend APN.

3. The method of claim 2, wherein the configuring step is performed by a vehicle manufacturer.

4. The method of claim 3, wherein the replacing step is performed remotely by a vehicle backend.

5. The method of claim 4, wherein the replacing step further comprises:
    connecting the telematics unit to the vehicle backend using the backend APN;
    receiving a service activation request from the telematics unit;
    removing the default APN from the telematics unit; and
    assigning the geographically-specific APN to the telematics unit.

6. A method of configuring a telematics unit in a vehicle with at least one access point name (APN), comprising the steps of:
    prior to a legal transfer of possession of the vehicle, configuring the telematics unit for a demonstration period at a vehicle dealership, wherein the configuring includes assigning a default APN to the telematics unit;
    during the demonstration period, providing vehicle services via the telematics unit using the default APN, wherein the vehicle services include data content associated with a geographic area of the vehicle, a geographic position of the vehicle dealership, or both;
    following the legal transfer of possession of the vehicle to a vehicle user, replacing the default APN with a geographically-specific APN at a time of vehicle services activation, wherein the geographically-specific APN is associated with a home country of the user; and
    providing vehicle services via the telematics unit using the geographically-specific APN during a subscription period.

7. The method of claim 6, wherein:
    the configuring step further comprises assigning a backend APN to the telematics unit, and
    the replacing step further comprises:
        establishing a connection between the telematics unit and a vehicle backend using the backend APN; and
        via the connection:
            receiving at the vehicle backend a service activation request from the telematics unit;
            removing the default APN from the telematics unit; and
            assigning the geographically-specific APN to the telematics unit.

* * * * *